United States Patent Office 3,223,694
Patented Dec. 14, 1965

3,223,694
PROCESS AND CATALYST FOR PRODUCTION OF RUBBERY POLYMERS
Ralph C. Farrar, Jr., Bartlesville, Okla., assignor to Phillips Petroleum Company, a corporation of Delaware
No Drawing. Filed Mar. 20, 1962, Ser. No. 181,171
6 Claims. (Cl. 260—94.3)

This invention relates to a process for polymerizing 1,3-butadiene or isoprene and to a novel catalyst composition therefor. In one aspect, the invention relates to a process for polymerizing 1,3-butadiene or isoprene so as to obtain a polymer containing a high percentage of trans 1,4-addition.

In recent years, there has been considerable activity in the development of processes for producing olefin polymers. Polymers of monoolefins, such as ethylene and propylene, prepared by these processes have received wide acceptance by many industries. The more recent discovery in the field of diene polymerization of certain so-called stereospecific catalysts, which make possible the formation of polymers having a certain configuration, has aroused a great deal of interest. The polymer so formed by use of these catalysts, particularly the butadiene and isoprene polymers, often have outstanding physical properties which render them equal to or even superior to natural rubbers. As a result, the syntheic rubbers are in many applications supplementing, or even replacing, natural rubbers. For example, trans 1,4-polybutadiene prepared with stereospecific catalyst has been found to be an excellent substitute for balata or glutta-percha.

It is an object of this invention to provide a novel process for polymerizing 1,3-butadiene or isoprene.

Another object of the invention is to provide a novel catalyst system which directs the polymerization of 1,3-butadiene or isoprene so that the resulting polymer is formed primarily by trans 1,4-addition.

Other and further objects and advantages of the invention will become apparent to those skilled in the art upon consideration of the accompanying disclosure.

Broadly speaking, the process of this invention comprises the step of contacting 1,3-butadiene or isoprene with a catalyst comprising lithium aluminum hydride, a chloride of titanium and elemental bromine. The titanium chlorides employed in the catalyst system include the di-, tri- and tetrachlorides. When utilizing this catalyst system to polymerize 1,3-butadiene or isoprene, a polymer containing at least 70 percent, e.g., from 85 to 95 percent and higher, trans 1,4-addition is obtained. It has previously been proposed to polymerize 1,3-butadiene with a catalyst comprising lithium aluminum hydride and titanium tetrachloride. The polymer product of this latter process is formed primarily by 1,2-addition of the butadiene. It was completely unexpected, therefore, when it was found that the addition of a small amount of bromine to a catalyst comprising lithium aluminum hydride and a titanium chloride directed the polymerization of butadiene from 1,2-addition to trans 1,4-addition of the monomer units.

The amount of lithium aluminum hydride used in the catalyst composition of this invention is usually in the range of 0.5 to 6 moles per mole of the titanium chloride. However, it is to be understood that amounts outside of the aforementioned range can be utilized. The mole ratio of bromine to lithium aluminum hydride plus titanium chloride is usually in the range of 0.1 to 1.5 moles of bromine per mole of lithium aluminum hydride plus titanium chloride although slightly larger amounts can be used if desired. The amount of the total catalyst system used, including the lithium aluminum hydride, the titanium chloride and elemental bromine, can vary over a rather wide range. The amount of total catalyst employed can be conveniently expressed in terms of the lithium aluminum hydride, and the amount of this component is generally in the range of 0.7 to 10, preferably in the range of 1 to 3, gram millimoles per 100 grams of monomer.

The polymerization process of this invention is usually carried out in the presence of a diluent. Diluents suitable for use in the process are hydrocarbons which are substantially inert and non-detrimental to the polymerization reaction. Suitable diluents include aromatics, such as benzene, toluene, xylene, ethylbenzene, and mixtures thereof. It is also within the scope of the invention to use straight and branched chain paraffins which contain up to and including 10 carbon atoms per molecule. Examples of paraffins which can be utilized include propane, normal butane, normal pentane, isopentane, normal hexane, isohexane, 2,2,4-trimethylpentane (isooctane), normal decane, and the like. Mixtures of these paraffinic hydrocarbons can also be employed as diluents in carrying out the process of this invention. Cycloparaffins, such as cyclohexane and methylcyclohexane, can also be used. Furthermore, mixtures of any of the aforementioned hydrocarbons can be used as diluents. It is usually preferred to carry out the polymerization by utilizing from 1 to 10 volumes of diluent per volume of monomer. However, greater or lesser amounts can be used without departing from the spirit and scope of the invention.

The polymerization process of this invention can be carried out at temperature varying over a relatively wide range, e.g., from 0 to 150° C. However, it is usually preferred to operate at a temperature in the range of 10 to 80° C. The polymerization reaction can be carried out under autogenous pressure or at any suitable pressure sufficient to maintain the reaction mixture substantially in the liquid phase. The pressure will thus depend upon the particular diluent being employed and the temperature at which the polymerization is conducted. However, higher pressure can be used if desired, these pressures being obtained by some such suitable method as the pressurization of the reactor with a gas which is inert with respect to the polymerization reaction.

The process of this invention can be carried out as a batch process by charging the monomer to a reactor containing catalyst and diluent. Although any suitable charging procedure can be used, it is usually preferred to add the catalyst components to a reactor containing diluent and thereafter introducing the monomer. The lithium aluminum hydride is charged to the reactor as an ether solution. Ethers suitable for preparing the solutions include dialkyl ethers. Examples of such ethers include dimethyl ether, diethyl ether, di-n-propyl ether, diisopropyl ether, di-n-butyl ether, diamyl ether, methyl ethyl ether, methyl isopropyl ether, ethyl amyl ether, and the like. The titanium chloride and bromine can be charged to the reactor directly without being dissolved in a solvent. However, it is often preferred to charge the titanium chloride as a solution in a hydrocarbon. The elemental bromine is preferably introduced as a solution in a hydrocarbon. It is also within the scope of the invention to preform the catalyst by reacting the catalyst ingredients within a separate catalyst preparation vessel. The resulting reaction product can then be charged to the reactor containing monomer and diluent, or these latter materials can be added after the catalyst. The process can also be carried out continuously by maintaining the above-mentioned concentrations of reactants in the reactor for a suitable residence time. The residence time in a continuous process will, of course, vary within rather wide limits, depending upon such variable as temperature, pressure, the ratio of catalyst components and the catalyst concentrations. In a continuous process, the residence time will usually fall within the range of one second to one hour when conditions within the specified ranges are employed. When a batch process is being utilized, the time for the reaction can be as high as 24 hours or more.

Various materials are known to be detrimental to the catalyst composition of this invention. These materials include carbon dioxide, oxygen and water. It is usually desirable, therefore, that the monomer be free of these materials as well as other materials which may tend to inactivate the catalyst. Any of the known means for removing such contaminants can be used. Furthermore, when a diluent is employed in the process, it is preferred that this material be substantially free of impurities such as water, oxygen and the like. In this connection, it is desirable to remove air and moisture from the reaction vessel in which the polymerization is to be conducted. Although it is preferred to carry out the polymerization under anhydrous or substantially anhydrous conditions, it is to be understood that some small amounts of these catalyst-inactivating materials can be tolerated in the reaction mixture. However, it is also to be understood that the amount of such material which can be tolerated is insufficient to cause complete deactivation of the catalyst.

Upon completion of the polymerization reaction, when a batch process is used, the total reaction mixture is then treated to inactivate the catalyst and recover the rubbery product. Any suitable method can be utilized in carrying out this treatment of the reaction mixture. In one method, the polymer is recovered by steam stripping the diluent from the polymer. In another suitable method, a catalyst-inactivating material, such as an alcohol, is added to the mixture so as to activate the catalyst and cause precipitation of the polymer. The polymer is then separated from the alcohol and diluent by any suitable method, such as decantation or filtration. It is often preferred to add only an amount of the catalyst-inactivating material which is sufficient to inactivate the catalyst without causing precipitation of the dissolved polymer. It has also been been found to be advantageous to add an antioxidant, such as 2,2′-methylene-bis(4-methyl-6-tert-butylphenol), to the polymer solution prior to recovery of the polymer. After addition of the catalyst inactivating material and the antioxidant, the polymer present in the solution can then be separated by the addition of an excess of a material such as ethyl alcohol or isopropyl alcohol. When the process is carried out continuously, the total effluent from the reactor can be pumped from the reactor to a catalyst-inactivating zone wherein the reactor effluent is contacted with a catalyst-inactivating material, such as an alcohol. When an alcohol is used as the catalyst-inactivating material, it also functions to precipitate the polymer. In the event catalyst-inactivating materials are employed which do not perform this dual role, a suitable material, such as an alcohol, can then be added to precipitate the polymer. It is, of course, to be realized that it is within the scope of the invention to employ other suitable means to recover the polymer from the solution. After separation from the water or alcohol and diluent by filtration or other suitable means, the polymer is then dried.

The polymers produced in accordance with this invention are rubbery polymers. The polymers can be compounded by the various methods such as have been used in the past for compounding natural and synthetic rubbers. Vulcanization accelerators, vulcanizing agents, reinforcing agents, and fillers such as have been employed in natural rubber can likewise be used when compounding the product of this invention.

A more comprehensive understanding of the invention can be obtained by referring to the following illustrative example, which is not intended, however, to be unduly limitative of the invention.

Samples of certain of the polymer products produced in the runs described in the examples were examined by infrared analysis. This work was carried out in order to determine the percentage of the polymer formed by trans 1,4-addition, 1,2-addition, and cis 1,4-addition of the butadiene. The procedure described hereinafter was employed in making these determinations.

The polymer samples were dissolved in carbon disulfide from a solution having 25 grams of polymer per liter of solution. The infrared spectrum of each of the solutions (percent transmission) was then determined in a commercial infrared spectrometer.

The percent of the total unsaturation present as trans 1,4- was calculated according to the following equation and consistent units:

$$\epsilon = \frac{E}{tc}$$

where $\epsilon$=extinction coefficient (liters-moles$^{-1}$-centimeters$^{-1}$); $E$=extinction ($\log I_0/I$); $t$=path length (centimeters); and $c$=concentration (moles double bond/liter). The extinction was determined at the 10.35 micron band and the extinction coefficient was 146 (liters-moles$^{-1}$-centimeters$^{-1}$).

The percent of the total unsaturation as 1,2- (or vinyl) was calculated according to the above equation, using the 11.0 micron band and an extinction coefficient of 209 (liters-moles$^{-1}$-centimeters$^{-1}$).

The percent of the total unsaturation present as cis 1,4- was obtained by subtracting the trans 1,4- and 1,2- (vinyl) determined according to the above procedures from the theoretical unsaturation, assuming one double bond per each $C_4$ unit in the polymer.

EXAMPLE

Butadiene was polymerized in a series of runs using a catalyst consisting of lithium aluminum hydride, titanium tetrachloride, and bromine. The following recipe was employed:

*Recipe*

| | Parts by weight |
|---|---|
| 1,3-butadiene | 100. |
| n-Hexane | 660. |
| Lithium aluminum hydride | 0.076 (2 mhm.)[1] |
| Bromine | Variable. |
| Titanium tetrachloride | Variable. |
| Diethyl ether | 2.5. |
| Temperature, ° F. | 122. |
| Time, hours | 19. |

[1] Gram millimoles per 100 grams monomer.

In each of the runs, n-hexane was charged first, after which the reactor was purged with nitrogen. The lithium aluminum hydride, titanium tetrachloride, bromine, and butadiene were then added in that order. Lithium aluminum hydride was charged as a solution in diethyl ether. Titanium tetrachloride and bromine were each charged in solution in cyclohexane. At the conclusion of each polymerization, the reaction was shortstopped by adding one part by weight per 100 parts monomer of 2,2′-methylene-bis(4-methyl-6-tert-butylphenol). Coagulation of the polymer was accomplished by adding isopropyl alcohol. The polymer was separated and dried under vacuum at 140° F. The results of the series of runs, using variable amounts of bromine and titanium tetrachloride, are shown hereinafter in the table.

TABLE

| Run No. | Bromine | | TiCl₄ | | LiAlH₄/TiCl₄, mole ratio | Br₂/LiAlH₄+TiCl₄, mole ratio | Conv., percent | Inh. visc.[1] | Misrostructure, percent | | |
|---|---|---|---|---|---|---|---|---|---|---|---|
| | Parts | Moles | Parts | Moles | | | | | cis | trans | Vinyl |
| 1 | 0.256 | 1.6 | 0.076 | 0.4 | 5/1 | 0.67/1 | 17 | 1.39 | | | |
| 2 | 0.320 | 2 | 0.076 | 0.4 | 5/1 | 0.83/1 | 29 | 1.53 | | | |
| 3 | 0.384 | 2.4 | 0.076 | 0.4 | 5/1 | 1/1 | 36 | 1.31 | 5.8 | 92.7 | 1.5 |
| 4 | 0.384 | 2.4 | 0.076 | 0.4 | 5/1 | 1/1 | 38 | 1.17 | 6.6 | 9.20 | 1.4 |
| 5 | 0.447 | 2.8 | 0.076 | 0.4 | 5/1 | 1.17/1 | 35 | 1.29 | | | |
| 6 | 0.320 | 2 | 0.190 | 1.0 | 2/1 | 0.67/1 | 28 | 1.13 | 10.7 | 87.6 | 1.7 |
| 7 | 0.384 | 2.4 | 0.190 | 1.0 | 2/1 | 0.8/1 | 27 | 1.14 | | | |
| 8 | 0.320 | 2 | 0.304 | 1.6 | 1.25/1 | 0.56/1 | 22 | 1.67 | 2.0 | 96.8 | 1.2 |

[1] One-tenth gram of polymer was placed in a wire cage made from 80 mesh screen and the cage was placed in 100 ml. of toluene contained in a wide-mouth, 4-ounce bottle. After standing at room temperature (approximately 77° F.) for 24 hours, the cage was removed and the solution was filtered to remove any solid particles present. The resulting solution was run through a viscometer supported in a 77° F. bath. The viscometer was previously calibrated with toluene. The relative viscosity is the ratio of the viscosity of the polymer solution to that of toluene. The inherent viscosity is calculated by dividing the natural logarithm of the relative viscosity by the weight of the original sample.

The data in the table show that polymerization of butadiene in the presence of a lithium aluminum hydride-titanium tetrachloride initiator system to which elemental bromine was added yielded polymers containing a high percentage of trans 1,4-addition, a low percentage of cis 1,4-addition, and a very low percentage of 1,2-addition (vinyl).

The rubbery polymers produced in accordance with this invention have utility in applications where natural and synthetic rubbers are used. They can be used in the manufacture of automobile tires and other rubber articles, such as gaskets, tubing, covering for wiring cable, rubber heels, rubber tile and golf balls.

As will be evident to those skilled in the art, many variations and modifications of this invention can be practiced in view of the foregoing disclosure. Such variations and modifications are clearly believed to come within the spirit and scope of the invention.

I claim:

1. A method for polymerizing a monomer selected from the group consisting of 1,3-butadiene and isoprene to form a polymer containing at least 70 percent trans, 1,4-addition which comprises contacting said monomer under polymerization conditions with a catalyst which forms on mixing components comprising (a) an ether solution of lithium aluminum hydride, (b) titanium tetrachloride, and (c) bromine, wherein the mol ratio of lithium aluminum hydride to titanium tetrachloride is in the range of 0.5 to 6 and the mol ratio of bromine to lithium aluminum hydride plus titanium tetrachloride is in the range of 0.1 to 1.5.

2. A method for polymerizing a monomer selected from the group consisting of 1,3-butadiene and isoprene to form a polymer containing at least 70 percent trans 1,4-addition which comprises contacting said monomer with a catalyst which forms on mixing components comprising (a) a solution of lithium aluminum hydride in a dialkyl, (b) titanium tetrachloride and (c) bromine, wherein the mol ratio of lithium aluminum hydride to titanium tetrachloride is in the range of 0.5 to 6 and the mol ratio of bromine to lithium aluminum hydride plus titanium tetrachloride is in the range of 0.1 to 1.5, said contacting occurring in the presence of a hydrocarbon diluent at a temperature in the range of 0 to 150° C. and at a pressure sufficient to maintain said diluent in liquid phase; and recovering the polymer so produced.

3. A method for producing a rubbery polymer of 1,3-butadiene containing at least 70 percent trans 1,4-addition which comprises contacting said 1,3-butadiene with a catalyst which forms on mixing a solution of lithium aluminum hydride in a dialkyl ether, titanium tetrachloride, and bromine, said contacting occurring in the presence of a hydrocarbon diluent under autogenous pressure and at a temperature in the range of 10 to 80° C., the mole ratio of said lithium aluminum hydride to titanium tetrachloride being in the range of 0.5 to 6.0 and the mole ratio of said bromine to said lithium aluminum hydride and titanium tetrachloride being in the range of 0.1 to 1.5; and recovering the rubbery polymer so produced.

4. A method for producing a rubbery polymer of 1,3-butadiene containing at least 70 percent trans 1,4-addition which comprises contacting said 1,3-butadiene with a catalyst which forms on mixing a solution of lithium aluminum hydride in a dialkyl ether, titanium tetrachloride, and bromine, said contacting occurring the presence of a hydrocarbon diluent under autogenous pressure and at a temperature in the range of 10 to 80° C., the mole ratio of said lithium aluminum hydride to titanium tetrachloride being in the range of 1.25 to 5 and the mole ratio of said bromine to said lithium aluminum hydride and titanium tetrachloride being in the range of 0.1 to 1.5; and recovering the rubbery polymer so produced.

5. A catalyst composition obtained by mixing an ether solution of lithium aluminum hydride, titanium tetrachloride, and bromine, the mole ratio of lithium aluminum hydride to titanium tetrachloride being in the range of 1.25 to 5 and the mole ratio of bromine to the lithium aluminum hydride and titanium tetrachloride being in the range of 0.1 to 0.5.

6. A catalyst composition consisting essentially of a product obtained by mixing an ether solution of lithium aluminum hydride, titanium tetrachloride, and bromine, wherein the mol ratio of lithium aluminum hydride to titanium tetrachloride is in the range of 0.5 to 6 and the mol ratio of bromine to lithium aluminum hydride plus titanium tetrachloride is in the range of 0.1 to 1.5.

References Cited by the Examiner

UNITED STATES PATENTS

| 2,959,576 | 11/1960 | Payne | 260—94.3 |
| 3,036,056 | 5/1962 | Rion | 260—94.3 |
| 3,066,129 | 11/1962 | Farrar | 260—94.3 |

FOREIGN PATENTS

| 591,994 | 12/1960 | Belgium. |
| 776,326 | 6/1957 | Great Britain. |
| 848,064 | 9/1960 | Great Britain. |
| 1,112,834 | 8/1961 | Germany. |

JOSEPH L. SCHOFER, *Primary Examiner.*

LEWIS GOTTS, *Examiner.*